United States Patent [19]
Suzuki et al.

[11] Patent Number: 5,769,041
[45] Date of Patent: Jun. 23, 1998

[54] TWO CYCLE FUEL INJECTION ENGINE

[75] Inventors: Takahiro Suzuki; Takeo Yoshida, both of Iwata, Japan

[73] Assignee: Yamaha Hatsudoki Kabushiki Kaisha, Iwata, Japan

[21] Appl. No.: 846,059

[22] Filed: Apr. 25, 1997

[30] Foreign Application Priority Data

Apr. 26, 1996 [JP] Japan .................................. 8-108252

[51] Int. Cl.⁶ .............................. F02B 27/04; F02D 17/02
[52] U.S. Cl. .................................. 123/73 C; 123/65 PE; 123/198 F
[58] Field of Search ............................. 123/73 C, 65 PE, 123/198 DB, 198 F

[56] References Cited

U.S. PATENT DOCUMENTS

| | | | |
|---|---|---|---|
| 4,509,488 | 4/1985 | Forster et al. | 123/198 F |
| 4,945,869 | 8/1990 | Klomp | 123/73 V |
| 4,949,689 | 8/1990 | Schlunke | 123/73 C |
| 4,991,558 | 2/1991 | Daly et al. | 123/73 C |
| 5,038,739 | 8/1991 | Ishii | 123/198 F |
| 5,097,811 | 3/1992 | Baumuller | 123/73 C |
| 5,205,254 | 4/1993 | Ito et al. | 123/73 C |
| 5,259,344 | 11/1993 | Huang et al. | 123/73 C |
| 5,404,843 | 4/1995 | Kato | 123/73 B |
| 5,404,857 | 4/1995 | Schommers | 123/198 DB |
| 5,408,966 | 4/1995 | Lipinski et al. | 123/198 F |
| 5,410,993 | 5/1995 | Masuda et al. | 123/65 PE |

*Primary Examiner*—David A. Okonsky
*Attorney, Agent, or Firm*—Knobbe, Martens, Olson & Bear LLP

[57] ABSTRACT

A two-cycle internal combustion engine control method and system wherein economy of fuel consumption and emission control is achieved by skipping fuel injection for a number of cycles dependent upon a decrease in the engine speed and load below a predetermined value. When fuel injection is skipped, the duration of fuel injection is increased. The escape of unburned fuel from the exhaust port is achieved when the fuel injection amount is increased by advancing the timing of the fuel injection and by retarding the opening of the exhaust port.

38 Claims, 11 Drawing Sheets

TWO CYCLE FUEL INJECTION ENGINE

BACKGROUND OF THE INVENTION

This invention relates to a two-cycle fuel-injected internal combustion engine and more particularly to a structure for such engines and method of operating such engines that improves their performance.

As is well-known, two-cycle internal combustion engines are very popular for many applications because of their relatively simple structure and their high specific power output. Because the engine fires every revolution of the crankshaft rather than every second revolution as in a four-cycle engine, greater power outputs can be obtained. In addition, because of the ported nature of such engines, the necessity for having poppet-type valves and their actuating mechanism is eliminated and cost can be reduced.

However, the ported nature of such engines and the overlap between the scavenge and exhaust port openings can present some problems in conjunction with the exhaust emission control particularly with respect to hydrocarbons.

In order to improve the performance of such engines, it has been proposed to employ direct cylinder injection. Direct cylinder injection has the advantage of having better control over the amount of fuel supplied and the timing of fuel delivery. This also offers the opportunity to provide stratification in the combustion chamber so as to operate on a leaner than stoichiometric mixture when considering the entire charge in the combustion chamber.

However, the problems of the possibility of fuel being discharged from the combustion chamber through the exhaust port without having been totally combusted is particularly troublesome in conjunction with two cycle direct fuel-injected engines.

As a method for improving the performance of two-cycle engines, it has also been proposed to operate during one or more cycles in a given number of cycles without introducing fuel to the combustion chamber. This gives the opportunity of improving engine running and exhaust emission control as well as fuel economy. This technique is particularly feasible with direct cylinder injected engines because it is more possible to control the cycle-to-cycle supply of fuel to the engine.

However, when there is cylinder fuel supply skipping under low speeds and low loads, it is also a practice to increase somewhat the amount of fuel supplied during the cycle when fuel delivery takes place. This increases the possibility that fuel will pass out of the exhaust system without having been completely combusted.

It is, therefore, a principal object of this invention to provide an improved method and operational system for a two-cycle, direct cylinder injected, internal combustion engine.

It is a further object of this invention to provide a method and system for operating a direct injected two-cycle internal combustion engine wherein running can be improved at low speeds and low loads by skipping cylinder fuel supply without the likelihood of fuel escaping from the exhaust port.

SUMMARY OF THE INVENTION

This invention is adapted to be embodied in a two-cycle internal combustion engine that is comprised of a cylinder block, cylinder head assembly that forms a cylinder bore. A piston reciprocates in the cylinder bore and forms a variable combustion chamber with the cylinder block, cylinder head assembly. A scavenge port is provided for admitting a charge to the combustion chamber and the scavenge port is opened and closed by the movement of the piston within the cylinder bore. An exhaust port is also provided for permitting exhaust gases to exit the combustion chamber and this port is also opened and closed by the movement of the piston. A fuel injector is provided for injecting fuel directly into the combustion chamber.

In accordance with a method for practicing the invention, under conditions of speed and load below a certain level, the supply of fuel to the cylinder by the fuel injector is skipped for a varying number of cycles depending on the running conditions. Simultaneously, the amount of fuel injected is increased from that which is supplied when the cylinder fuel supply is not skipped. When the fuel supply amount per injection cycle is increased, steps are taken to preclude the likelihood of fuel being discharged from the exhaust port.

In an engine operating in accordance with the invention, a control means is provided that controls the amount of fuel injection and which is effective when the engine speed and load are below a predetermined range for skipping fuel injection on one or more cycles. Means are also provided for increasing the amount of fuel supplied per injection when injection is being skipped on some cycles. Means are provided for precluding the likelihood of unburned fuel escaping from the exhaust port when the amount of fuel injected per cycle is increased.

DETAILED DESCRIPTION OF THE PREFERRED EMBODIMENTS OF THE INVENTION

Figure 1:
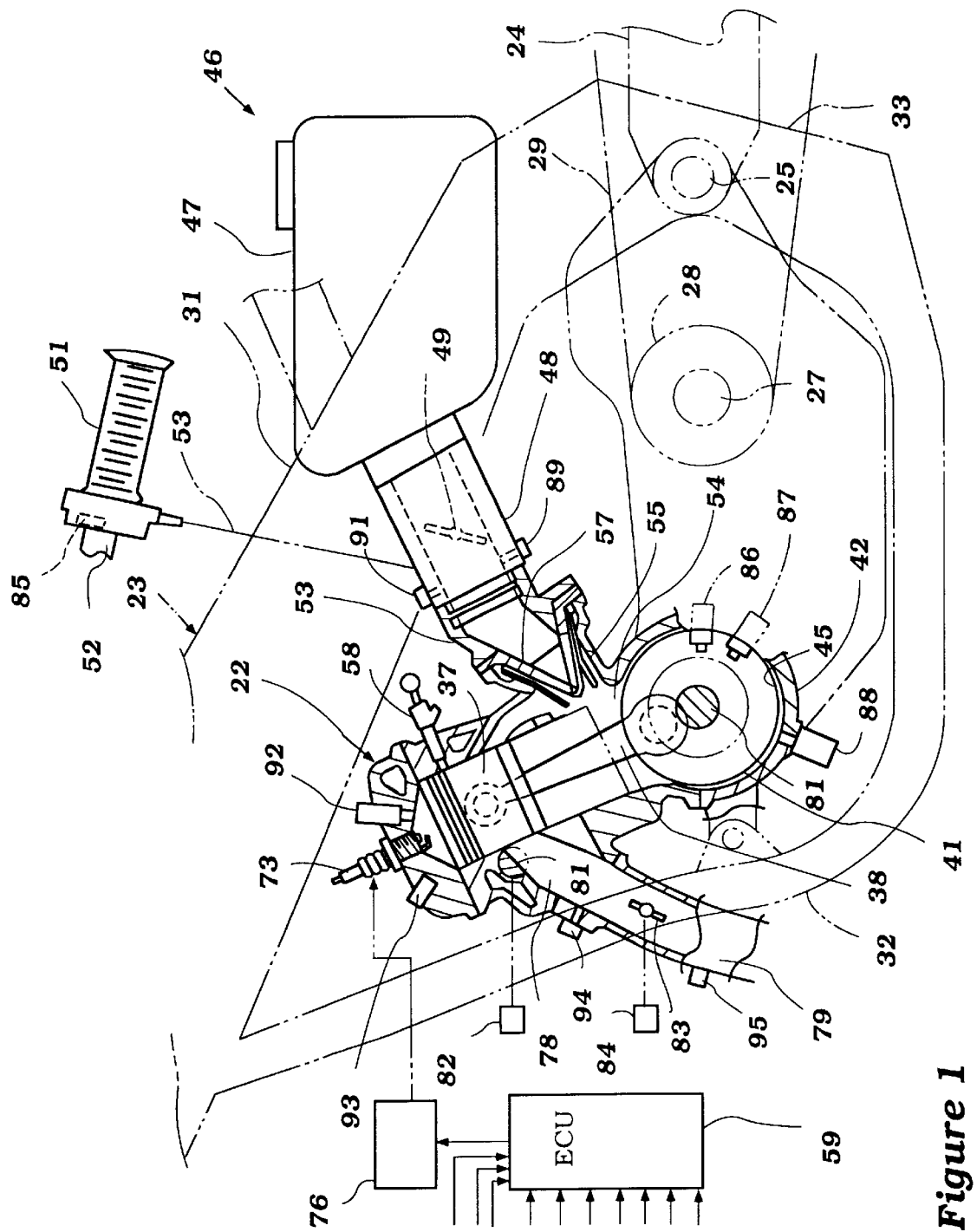
FIG. 1 is a partial side-elevational view of a motorcycle powered by an internal combustion engine constructed in accordance with an embodiment of the invention with a portion of the engine broken away and shown in section, other portions shown schematically and with the motorcycle body and components outside of the engine shown in phantom.

Referring now in detail to the drawings and initially to FIG. 1, a motorcycle is shown partially and in major portions in phantom. The motorcycle is identified generally by the reference numeral 21. The motorcycle 21 is powered by an internal combustion engine constructed and operated in accordance with an embodiment of the invention which engine is indicated generally by the reference numeral 22.

The engine 22 is shown in conjunction with a motorcycle such as the motorcycle 21 because the invention is primarily designed for utilization where compact high-output engine constructions are required and also where those engines are operated over a wide variety of speed and load ranges. Thus, the invention has particular utility with a motorcycle, although it can be utilized with a wide variety of other types of vehicles or other conditions wherein compact high-power output and varying speed and load conditions are encountered.

Continuing to refer to the motorcycle 21, it includes a frame assembly 23 that supports a trailing arm 24 about a pivot axis 25. A rear wheel (not shown) is supported at the rear end of the trailing arm in a well-known manner.

As is typical with motorcycle practice, the engine 22 includes an integral crankcase change speed transmission assembly, indicated generally by the reference numeral 26, and which may be of the continuously variable type or of a type having several fixed speed ratios. This transmission includes an output shaft 27 on which a sprocket 28 is affixed. The sprocket 28 drives a chain 29 or other flexible transmitter or other type of transmission for driving the rear wheel as is known in this art.

The frame 23 is comprised of a main frame member 31 and a down-tube 32 which are connected at their rear ends to a bracket assembly 33 that provides the pivotal support 25 for the trailing arm 24.

Referring now additionally to FIGS. 2 through 5, the engine 22, in the illustrated embodiment, is detected as being of the three cylinder inline type. Although the invention is described in conjunction with an engine having such an orientation, the invention is, as will become apparent to those skilled in the art, readily adaptable to varying cylinder numbers and cylinder orientations.

The engine 22 is comprised of a cylinder block 34 that is formed with three aligned cylinder bores 35. In a preferred form, the cylinder block 34 is made up of a lightweight casting formed from aluminum or aluminum alloy with the cylinder bores 35 being formed by plated, cast-in or inserted liners 36.

Pistons 37 are supported for reciprocation within the cylinder bores 35. The upper or small end of a connecting rod 38 is connected to each piston 37 by a piston pin 39. The lower or big ends of the connecting rods 38 are journaled on the throws of a crankshaft, indicated by the reference numeral 41. The crankshaft 41 is rotatably journaled within a crankcase that is formed by the skirt of the cylinder block 34 and a crankcase member 42 that is detachably connected thereto and which may form a portion of the combined crankcase transmission assembly 26.

A cylinder head assembly, indicated generally by the reference numeral 43, is affixed in any known manner to the cylinder block 34. This cylinder head assembly 43 is formed within individual recesses 44, each of which cooperates with a respective one of the cylinder bores 35 and the pistons 37 reciprocating therein so as to form a variable volume chamber and which combustion occurs. At times, the recesses 44 will be referred to as the combustion chambers since at top dead center, they form the substantial portion of the clearance volume of the engine 22.

Inasmuch as the engine 22 is of the two cycle type and operates on a crankcase compression principle, the crankshaft 41 and crankcase member 42 are provided with seals so as to provide individual sealed crankcase chambers 45, each of which is associated with a respective one of the cylinder bores 35.

Figure 6:
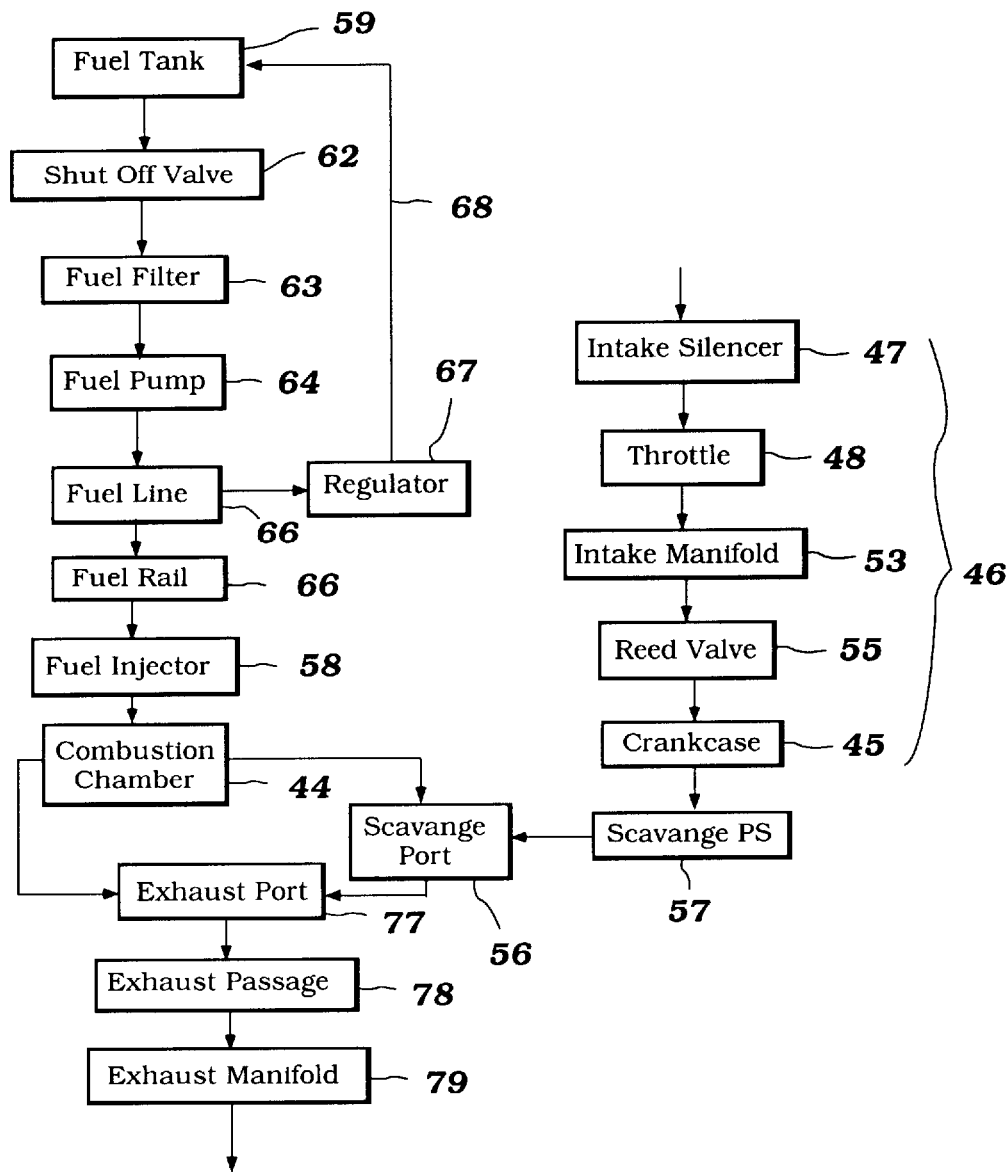
FIG. 6 is a schematic block diagram showing the components of the fuel and air charging and exhaust systems.

An intake air charge is delivered to each of these crankcase chambers 45 by means of an air induction system, which is indicated generally by the reference numeral 46 and which is shown schematically in block form in FIG. 6. This system 46 includes an intake silencer 47 which draws atmospheric air and silences it and also passes it through a filter (not shown). The thus filtered and silenced air is delivered to a throttle body 48 in which a butterfly-type throttle valve 49 is positioned. The throttle valve 49 is operated by a twist-grip throttle control 51 mounted on one of the handle bar ends 52 of the motorcycle 21. A wire actuator or the like 53 interconnects the twist-grip throttle with the throttle valve 49 for controlling its position, as is well-known in the art.

The throttle bodies 48 then communicate with respective branch passages of an intake manifold 53. The intake manifold 53 then communicates with individual intake ports 54 of the engine and specifically with the crankcase chambers 45. Read-type check valves 55 are positioned in the intake ports 54 so as to permit the charge to flow into the crankcase chambers 45 when the pistons 37 are moving upwardly in the cylinder bores 45 and to preclude reverse flow when the pistons 37 move downwardly.

Figure 4:
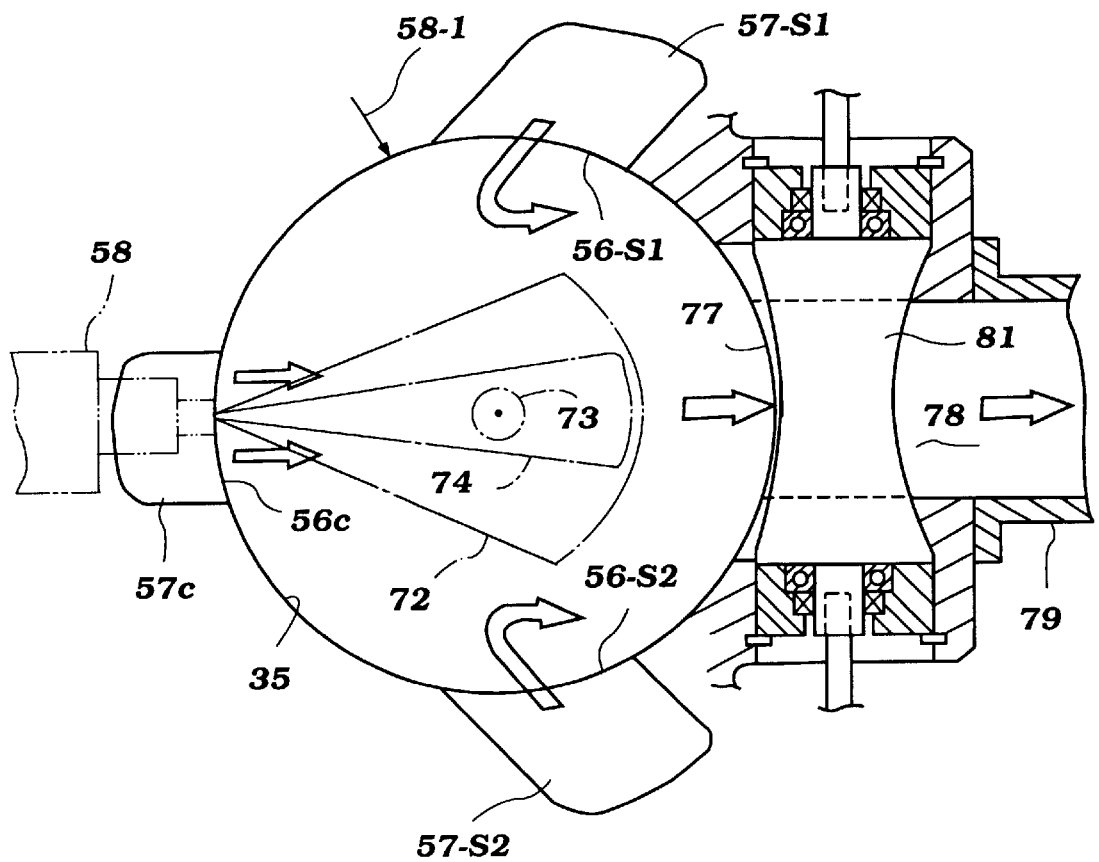
FIG. 4 is a cross-sectional view taken along a plane perpendicular to the plane of FIG. 3 and also showing the fuel injection path.
Figure 5:
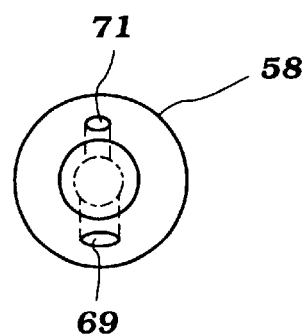
FIG. 5 is an end-elevational view on an enlarged scale showing the injector nozzle discharge ports.

As the pistons 37 move downwardly in the cylinder bores 35 to compress this charge, they will eventually open scavenge ports 56 which are formed at the cylinder bore ends of scavenge passages 57. As best seen in FIG. 4, the scavenging system comprises a center scavenge port 56c and a pair of side scavenge ports 56-s1 and 56-s2. The scavenge passages are numbered in a like manner.

The transferred charge is then further compressed in the combustion chambers 44 as the respective pistons 37 continue their up stroke. At some time during this cycle, as will be described in more detail later, fuel is injected into the combustion chamber 44, under conditions which will also be described, by a fuel injector, indicated generally by the reference numeral 58. The fuel injectors 58 are of the electronically controlled type and are operated by an ECU, indicated by the reference numeral 59, through a control strategy which will also be described in more detail later.

Figure 2:
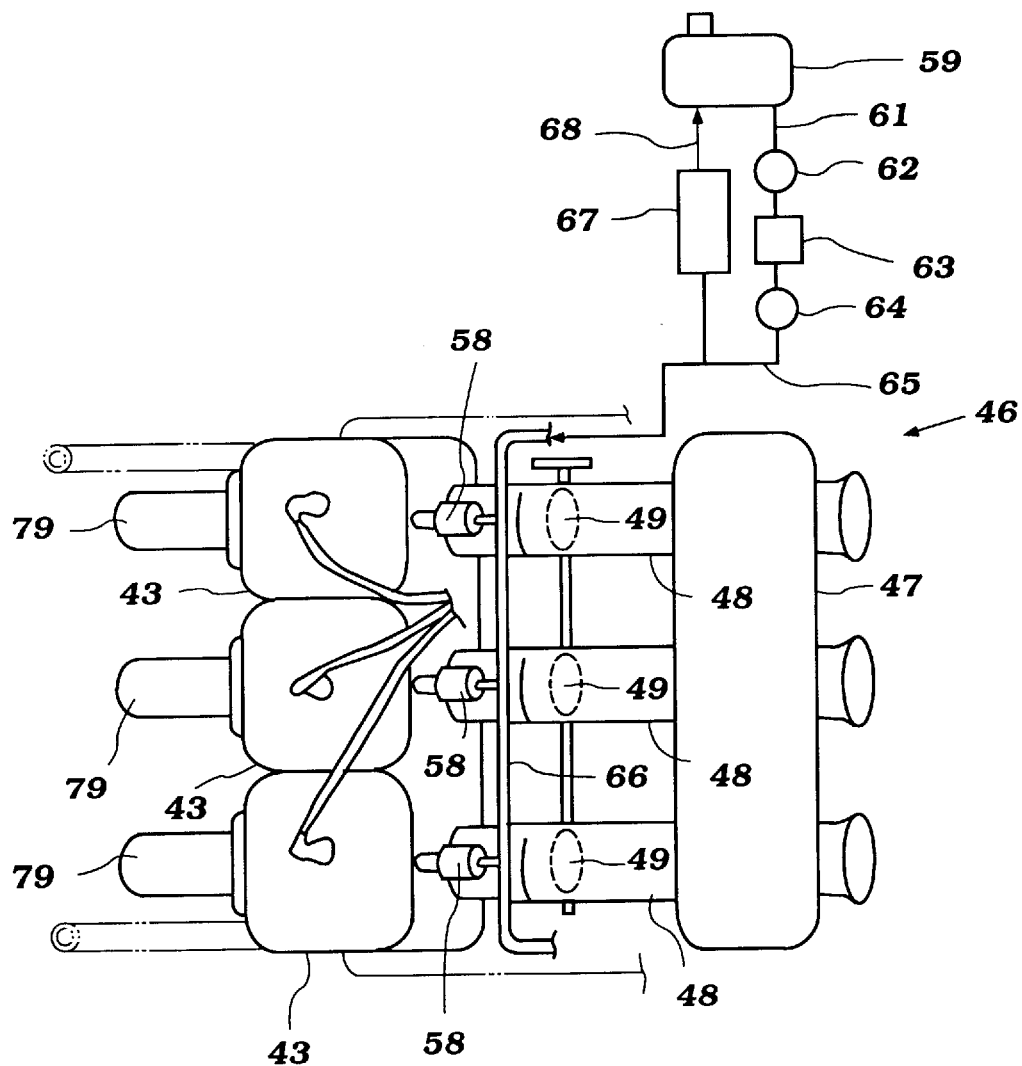
FIG. 2 is a top plan view of the engine, again showing certain components in a schematic form.

Fuel is supplied to the fuel injectors 58 by a fuel supply system that is shown in major part schematically in FIGS. 2 and 6. This fuel supply system includes a fuel tank 59 which is mounted primarily on the main frame tube 23 as is typical in this art. The fuel passes through a fuel conduit 61 from the tank 59 past a shut-off valve 62 when it is open. The fuel then is delivered to a fuel filter 63 and is pumped by a high pressure fuel pump 64.

The high pressure pump 64 delivers the fuel under high pressure through a pressure fuel conduit 65 to a fuel rail 66 which supplies the individual fuel injectors 58. A fuel pressure regulator 67 is positioned at one end of the fuel conduit 65 and controls the pressure at which fuel is supplied to the fuel injectors 58 by dumping excess fuel back to the fuel tank 59 through a return line 68.

The fuel injector 58 is configured so that it has a pair of discharged ports 69 and 71. The discharged port 69 is angled downwardly so as to spray toward the head of the piston as indicated by the spray path 72 in FIGS. 3 and 4. The nozzle port 71 is smaller in size and is directed upwardly toward the cylinder head recess 44 and specifically toward a spark plug 73 mounted therein. This spray path is indicated by the reference numeral 74 in FIGS. 3 and 4. This spray path is chosen so as to ensure that there will be a stratified, stoichiometric charge present at the gap 75 of the spark plug 73 when it is fired. The downwardly directed fuel much of which will deposit on the head of the piston 37 will have had time to evaporate so as to provide a generally homogeneous lean mixture in the remainder of the combustion chamber 44 which will burn under all running conditions and which will have had sufficient time so as to evaporate or vaporize by the time the flame front reaches it. This will be described in more detail later.

It will be seen, however, that the spray paths 72 and 74, in addition to providing larger and smaller amounts of spray respectively, encompass a larger and smaller areas respectively also so as to ensure the stratification of a stoichiometric mixture in the vicinity of the spark gap 75 and a more widely dispersed mixture in the remainder of the combustion chamber.

The spark plug 73 is fired by an ignition system 76 (FIG. 1) which is also controlled by the ECU 59. In the illustrated embodiment, the fuel injector 58 is disposed in the area above the center scavenge port 57. It may, however, be located between the center scavenge port 56C and one of the side scavenge ports 56-s1 or 56-s2 with the former location being shown at 58-1 in FIG. 4. In this positioning, the fuel mixture will also tend to be distributed by a tumble as well as a swirling action in the combustion chamber. The discharge port position shown in solid lines will primarily result in a tumbling motion in the combustion chamber.

The ECU 59 receives a number of input signals for controlling not only of the time of firing of the spark plug 73 but also the time of beginning and ending of injection of the fuel injectors 58. This control strategy and the control signals will be described later.

When the charge is ignited, it will burn and expand to drive the pistons 37 downwardly, as is well-known. Eventually, an exhaust port, indicated generally by the reference numeral 77, will be open so as to communicate the exhaust gases with an exhaust passage 78 formed in the cylinder block 34. An exhaust manifold 79 is affixed to this side of the cylinder block and conveys the exhaust gases to the atmosphere via a muffler and tail pipe, neither of which are shown.

Figure 3:
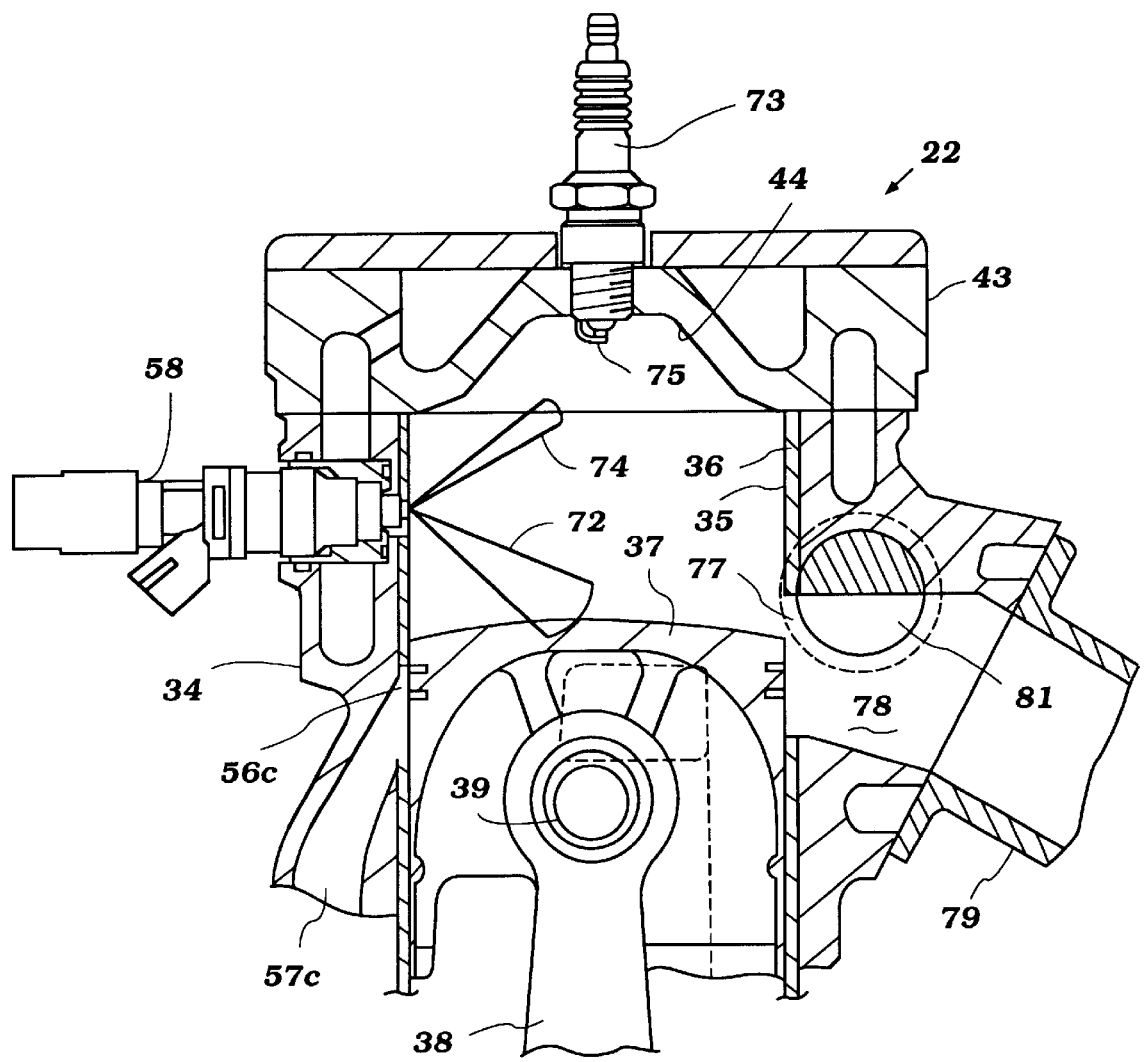
FIG. 3 is an enlarged cross-sectional view taken through one of the engine cylinders and showing the fuel injection spray pattern during a portion of the injection cycle.

An exhaust control valve, indicated generally by the reference numeral 81, is positioned in the cylinder block exhaust passage 78. The exhaust control valve 81 has a generally hourglass shape with a cutout portion so that when it is in its open position as shown in FIG. 3, there will be no restriction of the opening area or time of the exhaust port 77. When the exhaust control valve 81 is rotated from this position, it will shroud progressively increasing portions of the upper edge of the exhaust port 77 so as to advance the timing of closing of the exhaust port when the piston 37 is moving upwardly and delay the opening of the exhaust port 77 when the piston 37 is moving downwardly. This has the effect of increasing the compression ratio and also has an effect in reducing the amount of scavenging air flow out the exhaust port 77 under some running conditions as could cause excess unburned fuel to exit through the exhaust system. This concept will be described in more detail later, inasmuch as it forms an important part of the invention.

The exhaust control valve 81 is operated by a servo motor that is shown schematically in FIG. 1 and which is identified by the reference numeral 82. This servo motor 82 and the exhaust control valve 81 are also operated by the ECU 59 in accordance with a strategy that will also be described.

To further improve engine performance, a reflective control valve 83 may be provided in the exhaust manifold 79 or in the exhaust pipe at a downstream location. This effects the cylinder-to-cylinder tuning of the exhaust pulses and can be utilized to further improve engine performance, as is known in this art.

The reflective exhaust control valve 83 is operated by a further servo motor 84. This further servo motor 84 is operated by the ECU 59 in any known type of control strategy.

As has been noted, the ECU 59 receives certain input signals for the control of the various components which it operates. A few of the sensors are illustrated and will be described. It is to be understood, however, that this description is only indicative of certain types of conditions which can be sensed and that those skilled in the art will readily understand how other conditions can be sensed and utilized for engine control. These sensors include an engine load sensor in the form of a throttle position sensor 85 that is associated with the twist-grip throttle control 51 for indicating the position of the throttle valve 49.

In addition, there is a crank position sensor 86 associated with the crankshaft 41 for sending out pulses as the crankshaft rotates. By counting these pulses in a given time interval, it is possible to determine engine rotational speed.

A crank angle position sensor 87 is also mounted in the crankcase member 42 and is associated with the crankshaft 41 for providing a signal indicative of the angular position of the crankshaft 41.

A crankcase pressure sensor 88 is also mounted and senses the pressure in the crankcase chamber. This pressure sensor can be utilized to measure, among other things, the intake air volume.

There is further provided an intake air pressure sensor 89 which is mounted in the intake pipe 48 downstream of the throttle valve 49 for measuring the pressure of the inducted air. The air temperature is also measured at this location by an air temperature sensor 91.

An in-cylinder pressure detector 92 is mounted in the cylinder head 43 and senses the pressure in the combustion chamber 44.

A knock detector 93 is also mounted in the cylinder head 43 and provides signals indicative of knocking or incipient knocking condition.

An exhaust pressure sensor 94 is positioned in the exhaust pipe 79 upstream of the reflective control valve 83. An exhaust temperature sensor 95 is disposed downstream of this valve 83.

In addition to these sensed signals, a number of other conditions of either engine running or ambient conditions can be sensed by appropriate sensors. The arrows leading to the ECU 59 in FIG. 1 are representative of the signals from the sensors mentioned and other sensors that are conventionally used in conjunction with engine control.

Figure 7:
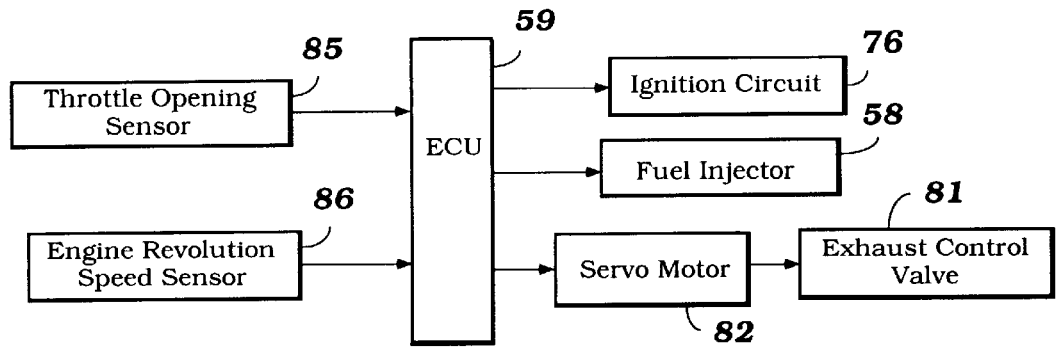
FIG. 7 is a block diagram showing the engine control unit and its relationship to the engine components that are controlled.

FIG. 7 is a schematic view that shows the relationship between the throttle opening sensor 85 and the engine speed sensor 86 in connection with the control of spark timing fuel injection beginning and ending in accordingly duration and the operation of the exhaust control valve.

Figure 8:
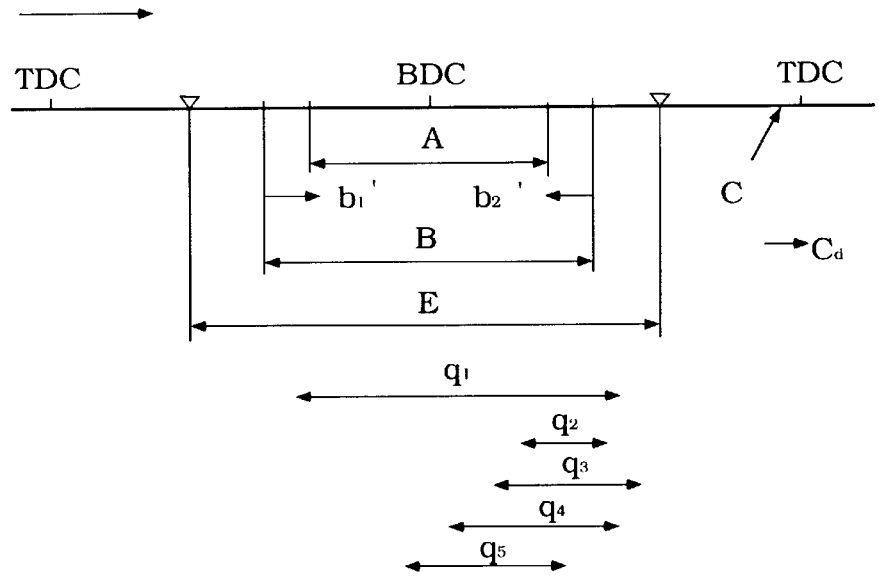
FIG. 8 is a timing diagram showing the events in a single revolution of the crankshaft in one cylinder.

FIG. 8 is a timing diagram showing the events that occur in the cylinder. It should be noted and it is an important concept in the invention that the fuel injector 58 is mounted in the cylinder block 34 so that the nozzle ports 69 and 71 are shrouded during at least a portion of the piston stroke. This protects the fuel injector 58 from the highest temperatures that exist when combustion occurs in the combustion chamber 44 and thus permits the use of a less-expensive fuel injector while still maintaining the advantages of direct fuel injection.

As may be seen, when the piston 37 moves downwardly from top dead center to a position e1, the fuel injector 58 will become exposed. This is well before the exhaust port 77 or the scavenge port 56 is opened.

Upon continued downward movement at the point b1, the exhaust port 77 will be opened. The point b1 is the point when the exhaust control valve 81 is in its fully opened position. As may be seen by the arrow b1', the opening time of the exhaust port can be adjusted in a retarding direction.

Upon continued downward movement of the piston 37, the scavenge ports 56 will eventually opened at the point a1.

As the piston moves downwardly to bottom dead center and then reverses its direction, it will close the scavenge port 56 at the point a2 and the exhaust port at the point b2. Again, the closing time of the exhaust port can be varied in the direction indicated by the arrow b2'. Finally, as the piston approaches top dead center and before the time of the firing of the spark plug at the point C, the fuel injector will be shrouded.

Thus, the scavenge port is opened for the time period A, which is fixed in this embodiment, the exhaust port is opened for the time period B which is adjustable and the fuel injector is exposed for the time E. Actual fuel injection timing and amount indicated by the arrows q will vary depending upon running conditions as will be described. Also, the firing of the spark plug will be adjusted so as to change the spark advance as is also known in the art.

In accordance with the invention, the engine is operated so that when under low loads and low speeds, the fuel injection from the injector 58 to each cylinder or combustion chamber 44 is skipped for a number of cycles that depends upon the engine load. Thus, at the threshold range when cylinder injection is skipped, the ECU 59 will skip injection of fuel every other cycle. In other words, there will be one skipped cycle for every firing cycle. As the load and speed drop below this threshold value, the number of cycles skipped increases from one to two, to three or more, such as five skipped cycles.

Figure 9:
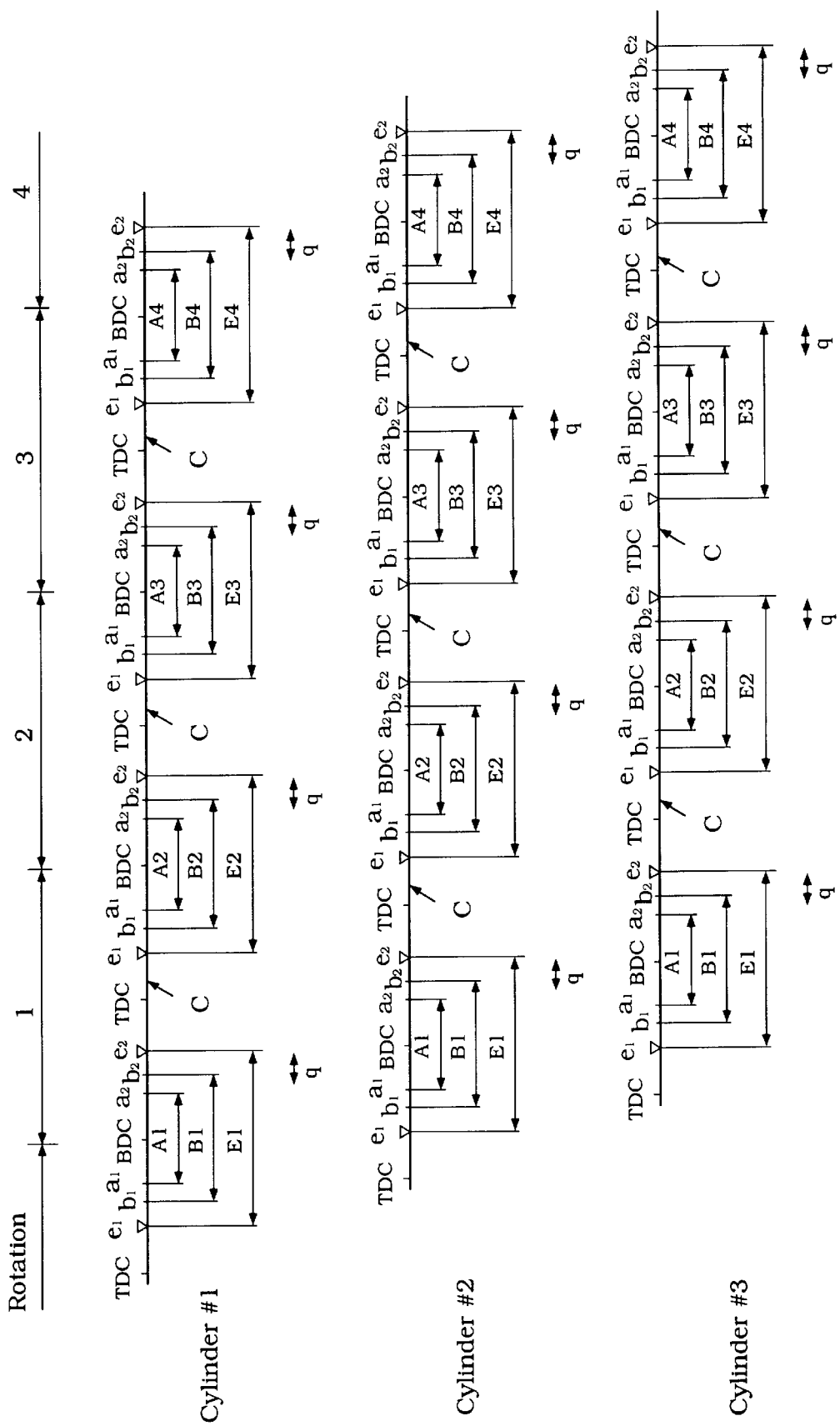
FIG. 9 is a timing diagram, in part similar to FIG. 8, and shows several cycles of operation for all cylinders during the low speed, low load running range.

FIG. 9 shows the effect of this on the individual cylinder through a series of revolutions. As may be seen, the cylinder skipping is done with alternate cylinders so as to maintain relatively even firing impulses. Thus, on the first revolution, fuel is injected in the amount q, an amount determined in a manner which will be described later, in cylinder number 1 while no fuel is injected for cylinders numbers 2 and 3.

On the next cycle of rotation, fuel is not injected to cylinder number 1 but is injected to cylinder number 2. Cylinder number 3 is also skipped under this condition.

On the following cycle, cylinders numbers 1 and 2 are skipped and cylinder number 3 is injected. The routine then continues to repeat in this cycle as seen in this figure. By doing this, the fuel economy can be improved and exhaust emission control also improves.

In accordance with an important feature of the invention, when injection skipping is effected, the amount of fuel injected is increased over the normal injection amount when cylinder skipping does not occur. In addition, the timing of beginning of injection is advanced under this circumstance so as to give the fuel a better chance to evaporate before firing. At the same time, the exhaust timing is advanced so that the exhaust port will open earlier and close earlier. By cutting down the duration of the opening of the exhaust port 77 and/or advancing injection timing, it will be ensured that fuel cannot escape from the exhaust ports before it has had an opportunity to combust.

This longer time before firing of the spark plug gives the fuel that is deposited on the piston head from the injection spray 72 time to evaporate. The elevated temperature of the piston head will assist in this evaporation.

Figure 10:
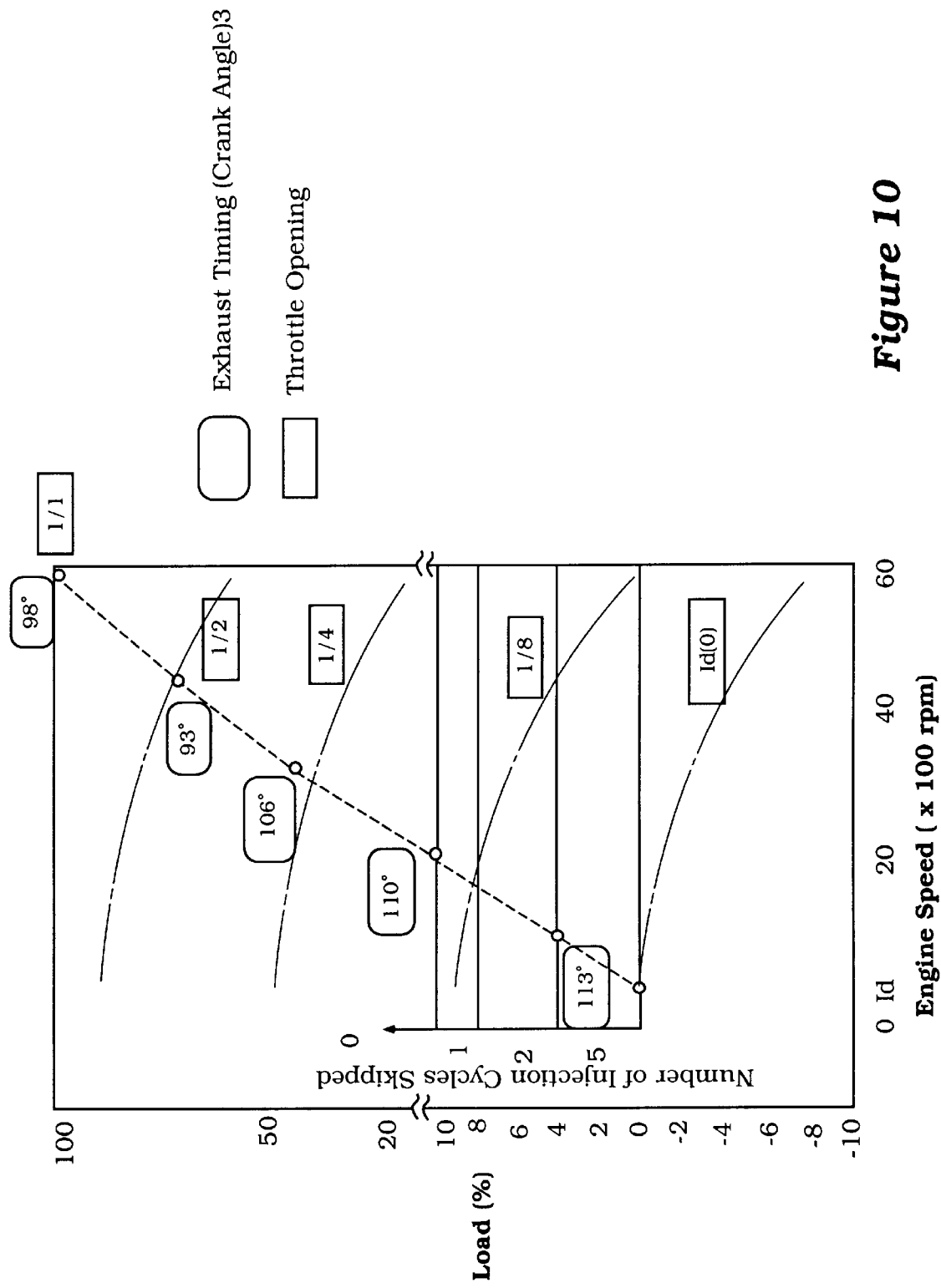
FIG. 10 is a graphical view showing the various control positions for engine speed and engine load at different throttle openings and shows the varying of the exhaust port timing under these conditions.

FIG. 10 is a graphical view showing the load on the engine based upon a percentage of full load, engine speed and various throttle openings to show how the engine skipping cycle is followed. At loads and speeds below the amount indicated by the horizontal line at 10% load, it will be seen that the number of injection cycles skipped is one, up until about 8% of load. Then, the number of cycles skipped is two down to about 4% of load. Below this, five or more injection cycles are skipped. Conventionally, the exhaust timing opening is delayed as the load on the engine decreases and the dotted line curve in FIG. 1 shows the relationship under these conditions.

Figure 11:
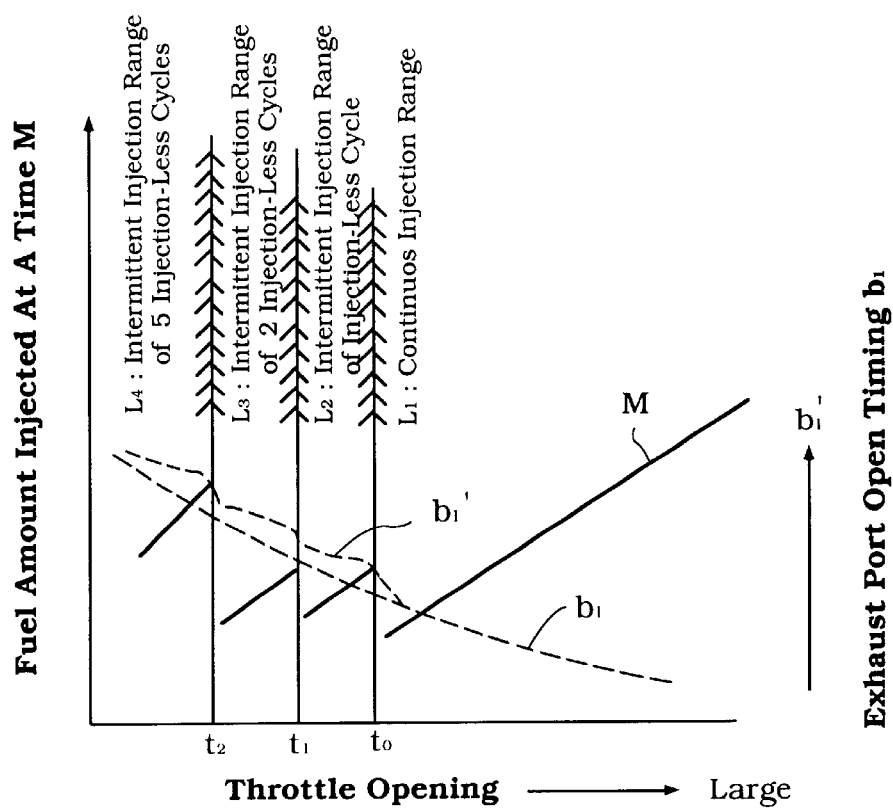
FIG. 11 is a graphical view showing the throttle opening and fuel injection amount and exhaust timing under the various control routines.

In addition, FIG. 11 shows how when cylinder injection skipping occurs, not only is there a change in the timing of the exhaust valve 81, but also the amount of fuel injected is increased from the continuous injection range. Also the initiation of fuel injection is advanced so as to ensure that there will be full evaporation of the fuel. Because of this and by closing the exhaust control valve 81, there will be less likelihood of loss of fuel from the exhaust port which has not been burned.

It will be seen that when the control of cylinder injection skipping is initiated at the point t0, that the curve b1 is modified to the curve b1' so that there will be a retardation in the timing of the opening of the exhaust port to ensure against fuel discharge.

Figure 12:
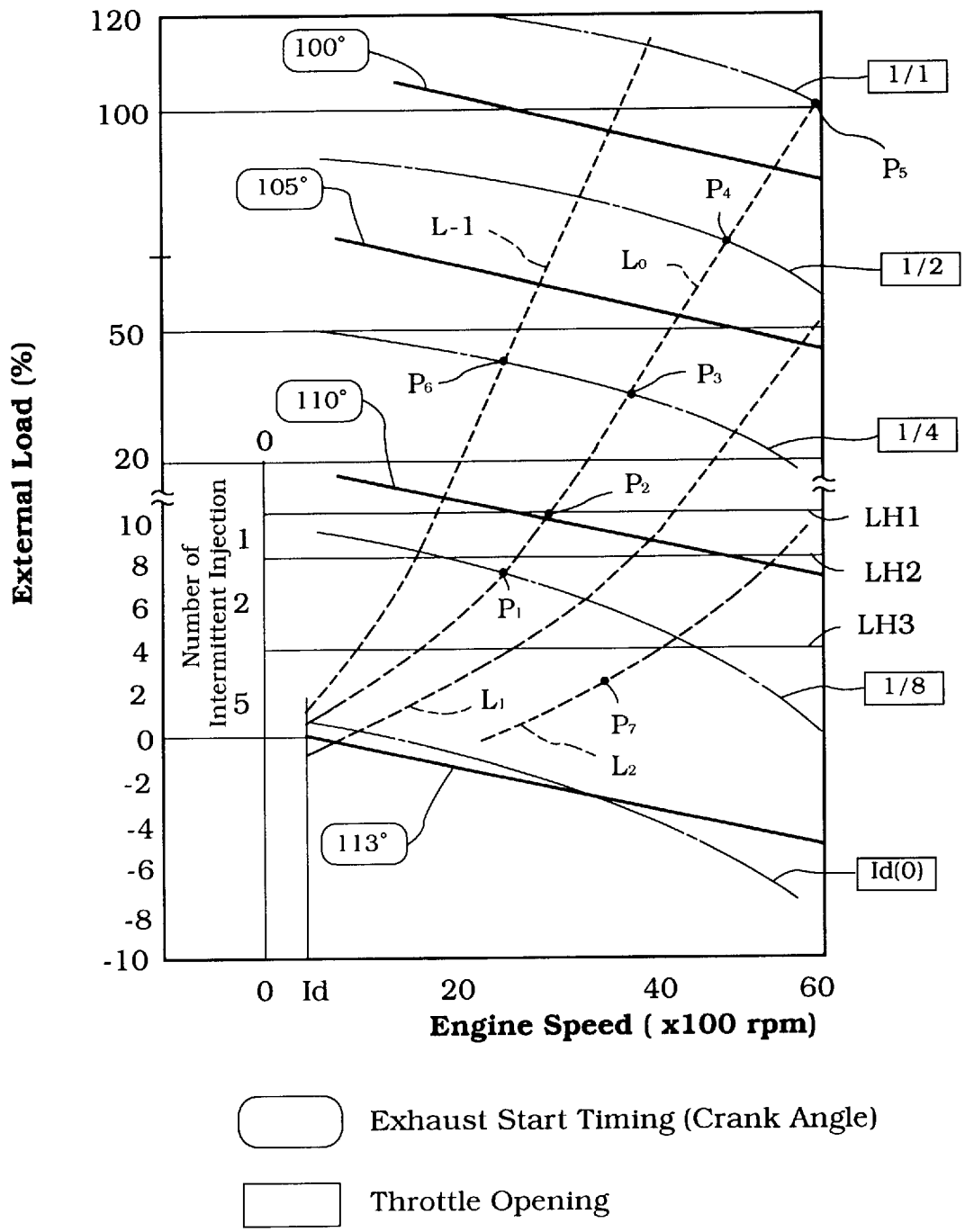
FIG. 12 is a graphical view, in part similar to FIG. 10, and shows, in addition, the various curves representative of different engine loads.

FIG. 12 is a graphical diagram similar to FIG. 10 but shows in more detail the varying conditions. In this figure, there are a number of broken line curves indicated by the legend L and these represent the load on the engine. The condition L0 is a condition when generally optimum conditions prevail and this is when traveling on a level road and wherein the rider assumes a crouched position so as to reduce the wind resistance. Thus, at full throttle and full engine speed, the 100% load condition exists and the engine will be operating at maximum speed, i.e., 6000 rpm.

Under the normal load condition, when operating on a level terrain, the throttle valve is closed or in the idle condition at the point P0 and the system is operating when there are five fuel injection cycles skipped. In other words, the injectors 58 inject fuel only once every six revolutions. In this condition, the timing of opening of the exhaust valve is retarded so as to occur at about 112.8° after top dead center. Thus, fuel cannot escape and the fuel will have adequate time to evaporate before the spark plug is fired. The fuel injection amounts and timing will be described later by reference to FIGS. 13 and 14.

As the operator continues to open the throttle valve to the point of ⅛th opening at the point P1, the number of injection skipped will be two and the exhaust port timing can be advanced to about 108° after top dead center. This operation continues as shown in the curve.

The curve L–b 1is a curve that shows when the load is less than normal, for example when coasting downhill. The curves L1 and L2 show progressively increasing loads such as when traveling uphill.

The data shown in FIG. 12 is programmed into a map of the ECU 59 so as to provide the appropriate control for the exhaust control valve 81 so as to achieve the desired control of the timing of opening of the exhaust port 77 to ensure against the escape of unburned fuel.

Figure 13:
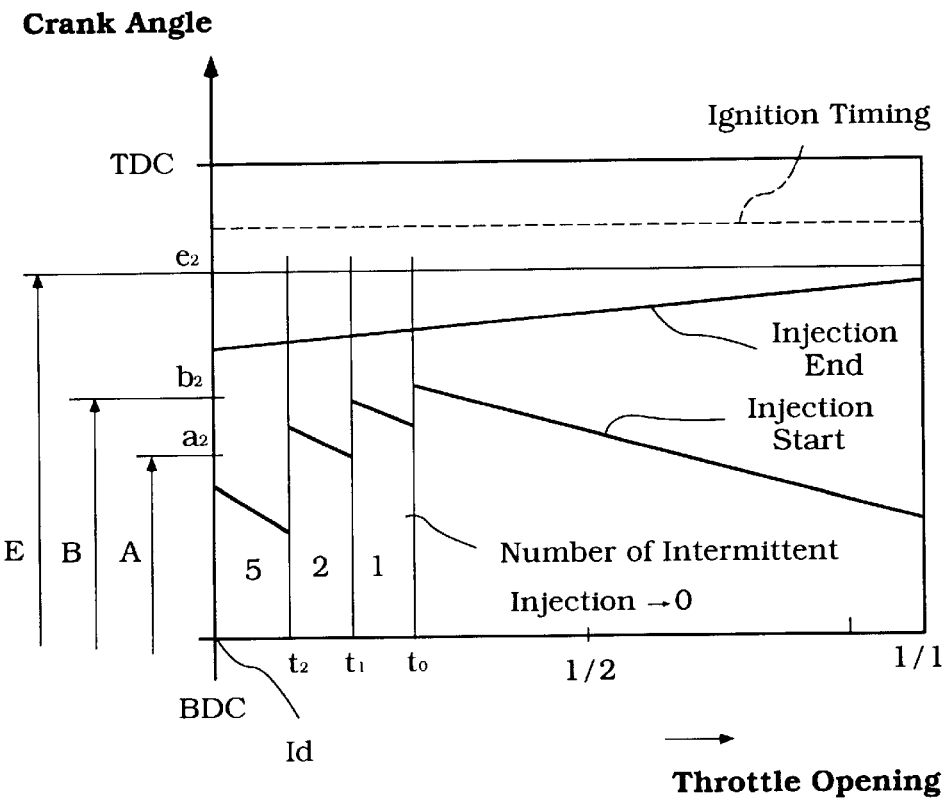
FIG. 13 is a graphical view showing the timing events in relation to crank angle and throttle valve opening in accordance with the various control routines.

The amount of fuel injected and the timing of the injection will now be described by reference to FIG. 13. FIG. 13 is a graphical view showing crank angle and throttle opening and how the injection timing is changed. As may be seen in this figure, when the operation is such that the throttle opening is T0 or greater, the injection start time is gradually advanced as the throttle opening is increased and the end of injection is gradually decreased. This increases the amount of fuel injected and as noted, all fuel injection ends before the point e2 when the fuel injector 58 is shrouded by the movement of the piston 37.

However, when proceeding to a condition where injection cycles are skipped, the injection timing is advanced and the amount of this advance is decreased as the throttle opening is decreased but still advanced over the normal every injection per cycle operation. The injection ending time may be maintained the same. By increasing the duration of injection, it will be ensured that the fuel can all evaporate before it is ignited by the firing of the spark plug, the timing of which is also indicated in this figure.

When the number of injections skipped increases from one to two at the throttle opening T1, the injection timing is again advanced. The amount of advance is decreased as the throttle opening is decreased but it is still greater than that of normal every cycle injection.

Finally, when five cycles are skipped, a further advance in fuel injection timing occurs so as to further increase the amount of fuel supplied.

With this arrangement, it is ensured that there is good smooth running and unburned fuel will not escape out of the exhaust port because of the delayed opening of the exhaust port.

Figure 14:
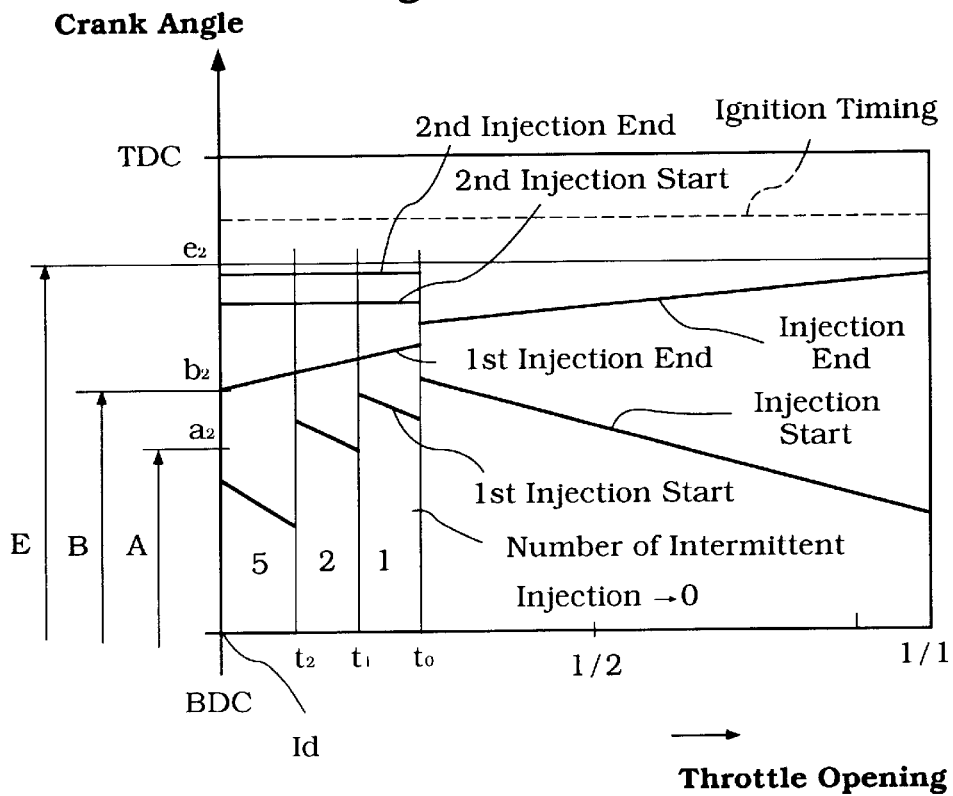
FIG. 14 is a graphical view, in part similar to FIG. 13, and shows another form of injection control routine.

FIG. 14 shows another control routine that can be employed in order to still further improve combustion efficiency. In this control routine, when fuel injections are skipped for one or more cycles, the fuel injection during the non-skip cycles is done in two segments. There is a first segment that begins at an advanced amount before normal injection, as shown in this figure. However, the injection ending cycle is advanced from the normal routine as shown by the line indicated as "first injection end". A further injection of a fixed amount occurs at the time immediately before the injector is shrouded. This further injection will be directed primarily toward the spark plug 73 because of the advanced position of the piston in the cylinder bore and thus, it will be ensured that there will be a stoichiometric charge present at the gap of the spark plug when the plug is fired. This will ensure not only good combustion but will raise the heat sufficiently so that the remaining fuel in the combustion chamber will ignite and burn before the exhaust port is open. As previously noted, the opening of the exhaust port is delayed.

Figure 15:
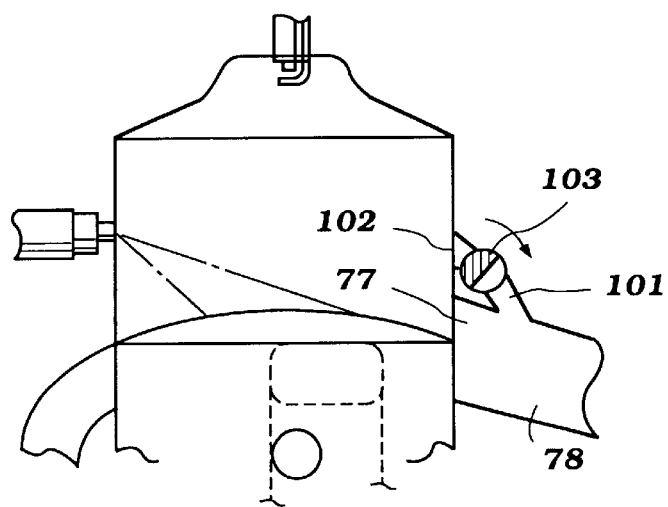
FIG. 15 is a partially schematic cross-sectional view, in part similar to FIG. 3, and shows another embodiment of the invention.

In the embodiments of the invention is thus far described, the engine has been provided with a single exhaust port 77 and the exhaust control valve 81 controls the timing of opening of that single exhaust port. FIG. 15 shows another embodiment which is basically the same. In this embodiment, components which are the same as those previously described have been identified by the same reference numerals and they will not be described again.

However, in this embodiment, the exhaust passage 78 is provided with a supplemental exhaust passage 101 that has a supplemental exhaust port 102 that is disposed higher in the cylinder than the main exhaust port 77. An exhaust control valve, indicated generally by the reference numeral 103, is provided to control the opening and closing of the supplemental exhaust port 102. When the supplemental exhaust port 102 is opened, the exhaust port opening will be advanced. However, by closing the exhaust control valve 103, then the timing of the opening of the exhaust port is delayed and the aforenoted results of precluding unburned fuel escape from the combustion chamber is achieved.

Thus, it should be apparent from the foregoing description that the described control system and methodology is very effective in obtaining good engine combustion performance and good fuel economy, without resolving emission problems. Of course, the foregoing description is that of the preferred embodiments of the invention. Various changes may be made. For example, it is possible to utilize injection where the fuel injector is mounted in the cylinder head assembly 43 rather than the cylinder block. Various other changes and modifications may be made without departing from the spirit and scope of the invention, as defined by the appended claims.

What is claimed is:

1. A method of operating a two-cycle internal combustion engine comprised of
a cylinder block, cylinder head assembly having a cylinder bore, a piston reciprocating in said cylinder bore and forming a variable volume combustion chamber with said cylinder block, cylinder head assembly, a scavenge port opening into said combustion chamber through said cylinder bore and opened and closed by the movement of said piston, an exhaust port opening into said combustion chamber through said cylinder bore and opened and closed by the reciprocation of said piston, and a fuel injector for injecting fuel directly into said combustion chamber, said method comprising the steps of measuring the load on said engine, skipping a number of fuel injections to said combustion chamber for a predetermined number of cycles when the load falls below a predetermined value, advancing the beginning of fuel injection when fuel injection is skipped, and taking action to preclude the escape of unburned fuel from said exhaust port when fuel injection is skipped.

2. A method of operating a two-cycle internal combustion engine as set forth in claim 1, wherein the preclusion of unburned fuel from exiting the exhaust port is accomplished by delaying the opening of the exhaust port.

3. A method of operating a two-cycle internal combustion engine as set forth in claim 1, wherein the preclusion of fuel exiting the exhaust port is accomplished by advancing the beginning of fuel injection when fuel injection is skipped.

4. A method of operating a two-cycle internal combustion engine as set forth in claim 3, wherein the preclusion of unburned fuel from exiting the exhaust port is also accomplished by delaying the opening of the exhaust port.

5. A method of operating a two-cycle internal combustion engine as set forth in claim 1, wherein the increased amount of fuel injected is supplied in two steps.

6. A method of operating a two-cycle internal combustion engine as set forth in claim 5, wherein the amount of fuel injected in one of the steps is varied with load.

7. A method of operating a two-cycle internal combustion engine as set forth in claim 5, wherein the amount of fuel injected in one of the steps is fixed regardless of the load.

8. A method of operating a two-cycle internal combustion engine as set forth in claim 7, wherein the amount of fuel injected in the other of the steps is varied with load.

9. A method of operating a two-cycle internal combustion engine as set forth in claim 8, wherein the step where the amount of fuel injected is varied with load occurs first.

10. A method of operating a two-cycle internal combustion engine as set forth in claim 1, wherein the number of cycles in which the fuel injection is skipped is increased as the load decreases.

11. A method of operating a two-cycle internal combustion engine as set forth in claim 10, wherein the preclusion of unburned fuel from exiting the exhaust port is accomplished by delaying the opening of the exhaust port.

12. A method of operating a two-cycle internal combustion engine as set forth in claim 10, wherein the preclusion of fuel exiting the exhaust port is accomplished by advancing the beginning of fuel injection when fuel injection is skipped.

13. A method of operating a two-cycle internal combustion engine as set forth in claim 12, wherein the preclusion of unburned fuel from exiting the exhaust port is also accomplished by delaying the opening of the exhaust port.

14. A method of operating a two-cycle internal combustion engine as set forth in claim 10, wherein the increased amount of fuel injected is supplied in two steps.

15. A method of operating a two-cycle internal combustion engine as set forth in claim 14, wherein the amount of fuel injected in one of the steps is varied with load.

16. A method of operating a two-cycle internal combustion engine as set forth in claim 14, wherein the amount of fuel injected in one of the steps is fixed regardless of the load.

17. A method of operating a two-cycle internal combustion engine as set forth in claim 16, wherein the amount of fuel injected in the other of the steps is varied with load.

18. A method of operating a two-cycle internal combustion engine as set forth in claim 17, wherein the step where the amount of fuel injected is varied with load occurs first.

19. A method of operating a two-cycle internal combustion engine as set forth in claim 1, wherein the engine load is measured by measuring the throttle opening of the engine and the speed of the engine.

20. A two-cycle internal combustion engine comprised of a cylinder block, cylinder head assembly having a cylinder bore, a piston reciprocating in said cylinder bore and forming a variable volume combustion chamber with said cylinder block, cylinder head assembly, a scavenge port opening into said combustion chamber through said cylinder bore and opened and closed by the movement of said piston, an exhaust port opening into said combustion chamber through said cylinder bore and opened and closed by the reciprocation of said piston, a fuel injector for injecting fuel directly into said combustion chamber, means for measuring the load on said engine, control means for skipping a number of fuel injections to said combustion chamber for a predetermined number of cycles when the measured load falls below a predetermined value and for advancing the beginning of fuel injection when fuel injection is skipped, and means for precluding the escape of unburned fuel from said exhaust port when fuel injection is skipped.

21. A two-cycle internal combustion engine as set forth in claim 20, wherein the means for precluding unburned fuel from exiting the exhaust port comprises an exhaust control valve effective for delaying the opening of the exhaust port.

22. A two-cycle internal combustion engine as set forth in claim 20, wherein the means for precluding fuel from exiting the exhaust port comprises means for advancing the beginning of fuel injection when fuel injection is skipped.

23. A two-cycle internal combustion engine as set forth in claim 22, wherein the means for the preclusion of unburned fuel from exiting the exhaust port also comprises an exhaust control valve effective for delaying the opening of the exhaust port.

24. A two-cycle internal combustion engine as set forth in claim 20, wherein the increased amount of fuel injected is supplied in two steps.

25. A two-cycle internal combustion engine as set forth in claim 24, wherein the amount of fuel injected in one of the steps is varied with load.

26. A two-cycle internal combustion engine as set forth in claim 24, wherein the amount of fuel injected in one of the steps is fixed regardless of the load.

27. A two-cycle internal combustion engine as set forth in claim 26, wherein the amount of fuel injected in the other of the steps is varied with load.

28. A two-cycle internal combustion engine as set forth in claim 27, wherein the step where the amount of fuel injected is varied with load occurs first.

29. A two-cycle internal combustion engine as set forth in claim 20, wherein the number of cycles in which the fuel injection is skipped is increased as the load decreases.

30. A two-cycle internal combustion engine as set forth in claim 29, wherein the means for precluding unburned fuel from exiting the exhaust port comprises an exhaust control valve effective for delaying the opening of the exhaust port.

31. A two-cycle internal combustion engine as set forth in claim 29, wherein the means for precluding fuel exiting the exhaust port comprises means for advancing the beginning of fuel injection when fuel injection is skipped.

32. A two-cycle internal combustion engine as set forth in claim 31, wherein the means for precluding unburned fuel from exiting the exhaust port also comprises an exhaust control valve effective for delaying the opening of the exhaust port.

33. A two-cycle internal combustion engine as set forth in claim 29, wherein the increased amount of fuel injected is supplied in two steps.

34. A two-cycle internal combustion engine as set forth in claim 33, wherein the amount of fuel injected in one of the steps is varied with load.

35. A two-cycle internal combustion engine as set forth in claim 33, wherein the amount of fuel injected in one of the steps is fixed regardless of the load.

36. A two-cycle internal combustion engine as set forth in claim 35, wherein the amount of fuel injected in the other of the steps is varied with load.

37. A two-cycle internal combustion engine as set forth in claim 36, wherein the step where the amount of fuel injected is varied with load occurs first.

38. A two-cycle internal combustion engine as set forth in claim 20, wherein the engine load is measured by measuring the throttle opening of the engine and the speed of the engine.

* * * * *